United States Patent
Hurley et al.

(10) Patent No.: US 6,553,167 B2
(45) Date of Patent: Apr. 22, 2003

(54) FIBER OPTIC CABLES HAVING ULTRA-LOW SHRINKING FILAMENTS AND METHODS OF MAKING THE SAME

(75) Inventors: William C. Hurley, Hickory, NC (US); Larry W. Self, Newton, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/873,671

(22) Filed: Jun. 4, 2001

(65) Prior Publication Data

US 2002/0181906 A1 Dec. 5, 2002

(51) Int. Cl.[7] ................................. G02B 6/44
(52) U.S. Cl. .......................... 385/102; 385/103
(58) Field of Search .................. 385/100, 102–103, 385/113

(56) References Cited

U.S. PATENT DOCUMENTS

| | | | |
|---|---|---|---|
| 4,141,622 A | 2/1979 | Beal | 350/96.23 |
| 4,269,024 A | 5/1981 | Ashpole et al. | 57/232 |
| 4,318,588 A | 3/1982 | Zeidler et al. | 350/96.23 |
| 4,374,608 A | 2/1983 | Anderson | 350/96.23 |
| 4,441,787 A | 4/1984 | Lichtenberger | 350/96.23 |
| 4,457,583 A | 7/1984 | Mayr et al. | 350/96.23 |
| 4,479,984 A | 10/1984 | Levy et al. | 427/54.1 |
| 4,534,618 A | 8/1985 | Brüggendieck | 350/96.23 |
| 4,659,174 A | 4/1987 | Ditscheid et al. | 350/96.23 |
| 4,660,926 A | 4/1987 | Mayr et al. | 350/96.23 |
| RE32,436 E | 6/1987 | Hartig | 350/96.23 |
| 4,709,983 A | 12/1987 | Plessner et al. | 350/96.23 |
| 4,723,832 A * | 2/1988 | Okazato et al. | 174/70 A |
| 4,740,054 A | 4/1988 | Becker et al. | 350/96.23 |
| 4,778,245 A | 10/1988 | Ueno et al. | 350/96.23 |
| 4,787,702 A | 11/1988 | Khalil | 350/96.23 |
| 4,893,893 A | 1/1990 | Claxton et al. | 350/96.23 |
| 5,016,973 A | 5/1991 | Hager et al. | 350/96.23 |
| 5,031,996 A | 7/1991 | Saller et al. | 350/96.23 |
| 5,113,468 A | 5/1992 | Baker | 385/100 |
| 5,148,509 A | 9/1992 | Kannabiran | 385/109 |
| 5,224,191 A | 6/1993 | Zeidler | 385/111 |
| 5,345,525 A | 9/1994 | Holman et al. | 385/104 |
| 5,389,442 A | 2/1995 | Arroyo et al. | 428/396 |
| 5,509,097 A | 4/1996 | Tondi-Resta et al. | 385/113 |
| 5,566,266 A * | 10/1996 | Nave et al. | 285/95 |
| 5,619,606 A | 4/1997 | Bonicel | 385/102 |
| 5,627,932 A | 5/1997 | Kiel et al. | 385/102 |
| 5,636,307 A | 6/1997 | Cowen et al. | 385/102 |
| 5,689,601 A | 11/1997 | Hager et al. | 385/100 |
| 5,706,382 A | 1/1998 | Smith | 385/102 |
| 5,751,879 A | 5/1998 | Graham et al. | 385/103 |

(List continued on next page.)

OTHER PUBLICATIONS

LSZH™MIC® Cables 2–24 Fibers (Corning Cable Systems Publication © 1995).

*Primary Examiner*—Robert H. Kim
*Assistant Examiner*—Krystyna Suchecki
(74) *Attorney, Agent, or Firm*—Michael E. Carroll, Jr.

(57) ABSTRACT

A fiber optic cable and method of manufacturing the same having at least one optical fiber component, at least one strength member and at least one ultra-low shrinking filament. The at least one ultra-low shrinking filament having a shrinkage of about 0.2% or less when heated and held at about 85° C. for about seven days. At least one strength member and at least one ultra-low shrinking filament being disposed generally between the at least one optical fiber component and a cable jacket. The jacket generally surrounding the at least one optical fiber component, the at least one strength member and the ultra-low shrinking filament. The cable can include an interfacial layer interposed between said at least one optical fiber component and the jacket. Additionally, the cable can be riser or plenum rated.

38 Claims, 2 Drawing Sheets

U.S. PATENT DOCUMENTS

| | | | |
|---|---|---|---|
| 5,822,485 A | 10/1998 | Nelson et al. | 385/112 |
| 5,920,671 A | 7/1999 | Smith | 385/102 |
| 5,978,536 A | 11/1999 | Brandi et al. | 385/102 |
| 6,088,499 A | 7/2000 | Newton et al. | 385/112 |
| 6,178,278 B1 | 1/2001 | Keller et al. | 385/109 |
| 6,205,277 B1 | 3/2001 | Mathis et al. | 385/106 |
| 6,229,944 B1 | 5/2001 | Yokokawa et al. | 385/114 |
| 6,389,204 B1 * | 5/2002 | Hurley | 385/102 |
| 6,415,085 B1 * | 7/2002 | Graham et al. | 385/102 |
| 2001/0055452 A1 * | 12/2001 | Kawabata | 385/100 |

* cited by examiner

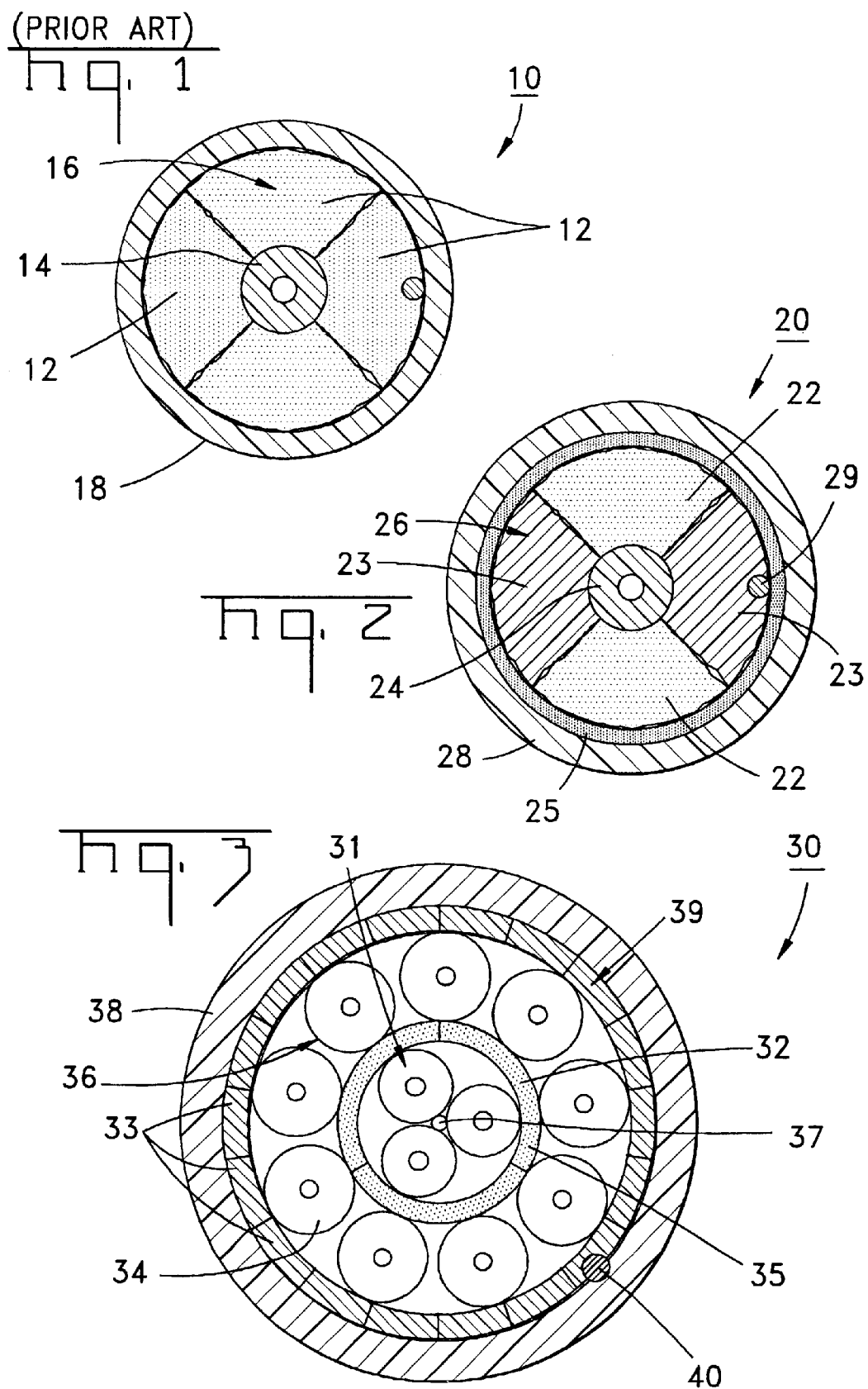

FIBER OPTIC CABLES HAVING ULTRA-LOW SHRINKING FILAMENTS AND METHODS OF MAKING THE SAME

FIELD OF THE INVENTION

The present invention relates generally to fiber optic cables and, more particularly, to fiber optic cables having ultra-low shrinking filaments.

BACKGROUND OF THE INVENTION

Fiber optic cables include optical fibers that are capable of transmitting voice, video, and data signals. Fiber optic cables have advantages over electrical voice, video and data signal carriers, for example, increased data capacity. As businesses and households demand increased data capacity, fiber optic cables can eventually displace electrical voice, video, and data signal carriers. This demand for fiber optic cables has led to shortages of fiber optic cable materials.

Aramid fibers are cable materials that can serve several functions, such as: providing tensile strength to the fiber optic cable; cushioning the optical fibers from compression and impact loads; covering the optical fibers during the extrusion of the outer jacket to prevent the optical fibers from sticking to the extruded outer jacket; and binding the optical fibers together to prevent relative movement. Aramid fibers can, however, be expensive.

In addition to being cost effective, cables should be simple to manufacture and have a relatively small diameter. An example of a reduced diameter indoor fiber optic cable is disclosed in U.S. Pat. No. 5,627,932, which is incorporated herein by reference. This fiber optic cable requires a tight buffered optical fiber or fibers disposed within a layer of loose aramid fibers, more specifically kevlar® aramid fibers, which are surrounded by an outer jacket. This cable can be made of flame retardant materials for riser or plenum applications; however, the cable has disadvantages. For example, the cable requires a significant quantity of aramid fibers, which are typically expensive, thereby increasing cable manufacturing costs.

Fiber optic cables should also have acceptable levels of attenuation. An example of a fiber optic cable designed to prevent attenuation as a result of the manufacturing process is disclosed in U.S. Pat. No. 5,822,485, which is incorporated herein by reference. This fiber optic cable or cable element requires a jacket surrounding an optical fiber and aramid fibers, such as kevlar®, without an intended lay. The manufacturing process requires that the tension applied to the aramid fibers during manufacturing does not exceed the tension applied to the optical fiber during manufacturing. Although this fiber optic cable is designed to prevent attenuation induced during the manufacturing process, this design has several disadvantages. For example, the cable requires a significant quantity of aramid fibers, which are typically expensive, thereby increasing cable manufacturing costs.

FIG. 1 (prior art) is a cross-sectional view of a fiber optic premises cable 10. Cable 10 comprises four ends of aramid fibers 12, more particularly four 2450 denier kevlar® fibers, forming a layer 16 that can be layless or stranded around a single tight buffered optical fiber 14. Outer jacket 18 generally surrounds layer 16. The present inventor has discovered that cable 10 only requires two of the four aramid fibers 12 to provide the requisite tensile strength, the two additional aramid fibers 12 are required to provide coverage and padding for optical fiber 14.

ASPECTS OF THE INVENTION

An aspect of the present invention includes a fiber optic cable having at least one optical fiber component, at least one strength member and at least one ultra-low shrinking filament. The at least one ultra-low shrinking filament having a shrinkage of about 0.2% or less when heated and held at about 85° C. for about seven days. The at least one strength member and at least one ultra-low shrinking filament being disposed generally between the at least one optical fiber component and a jacket. The jacket generally surrounds the at least one optical fiber component, the at least one strength member and the at least one ultra-low shrinking filament. The cable can include an interfacial layer interposed between the at least one optical fiber component and the jacket. Additionally, the cable can be riser or plenum rated.

Another aspect of the present invention includes a fiber optic cable having at least one optical fiber component generally stranded around a central member. A first layer including at least one strength member and at least one ultra-low shrinking filament. The first layer being disposed generally between the at least one optical fiber component and a jacket. The at least one ultra-low shrinking filament having a shrinkage of about 0.2% or less when heated and held at about 85° C. for about seven days. The jacket generally surrounds the at least one optical fiber component, central member and the first layer. The cable can include an interfacial layer interposed between the at least one optical fiber component and the jacket. Additionally, the cable can be riser or plenum rated.

A further aspect of the present invention includes a fiber optic cable including a first group of tight-buffered optical fiber components being generally adjacent a central member. A first layer being disposed generally between the first group of tight-buffered optical fiber components and a second group of tight-buffered optical fiber components. A second layer being disposed generally between the second group of tight-buffered optical fiber components and a jacket. The jacket generally surrounds the central member, the first and second groups and the first and second layers. One of the layers includes at least one ultra-low shrinking filaments having a shrinkage of about 0.2% or less when heated and held at about 85° C. for about seven days. The cable can include an interfacial layer interposed between the central member and the jacket. Additionally, the cable can be riser or plenum rated.

Yet another aspect of the present invention includes a method of manufacturing a fiber optic cable. The method includes paying off at least one optical fiber component, at least one strength member, and at least one ultra-low shrinking filament. The at least one ultra-low shrinking filament having a shrinkage of about 0.2% or less when heated and held at about 85° C. for about seven days. Defining a cable core by placing said at least one strength member and at least one ultra-low shrinking filament adjacent to at least one optical fiber component. The method also includes extruding a jacket around said core.

BRIEF DESCRIPTION OF THE FIGURES

FIG. 1 is a cross-sectional view of a prior art premises cable.

FIG. 2 is a cross-sectional view of a fiber optic cable in accordance with the present invention.

FIG. 3 is a cross-sectional view of a fiber optic cable in accordance with another embodiment of the present invention.

DETAILED DESCRIPTION OF THE INVENTIONS

Figure 4:
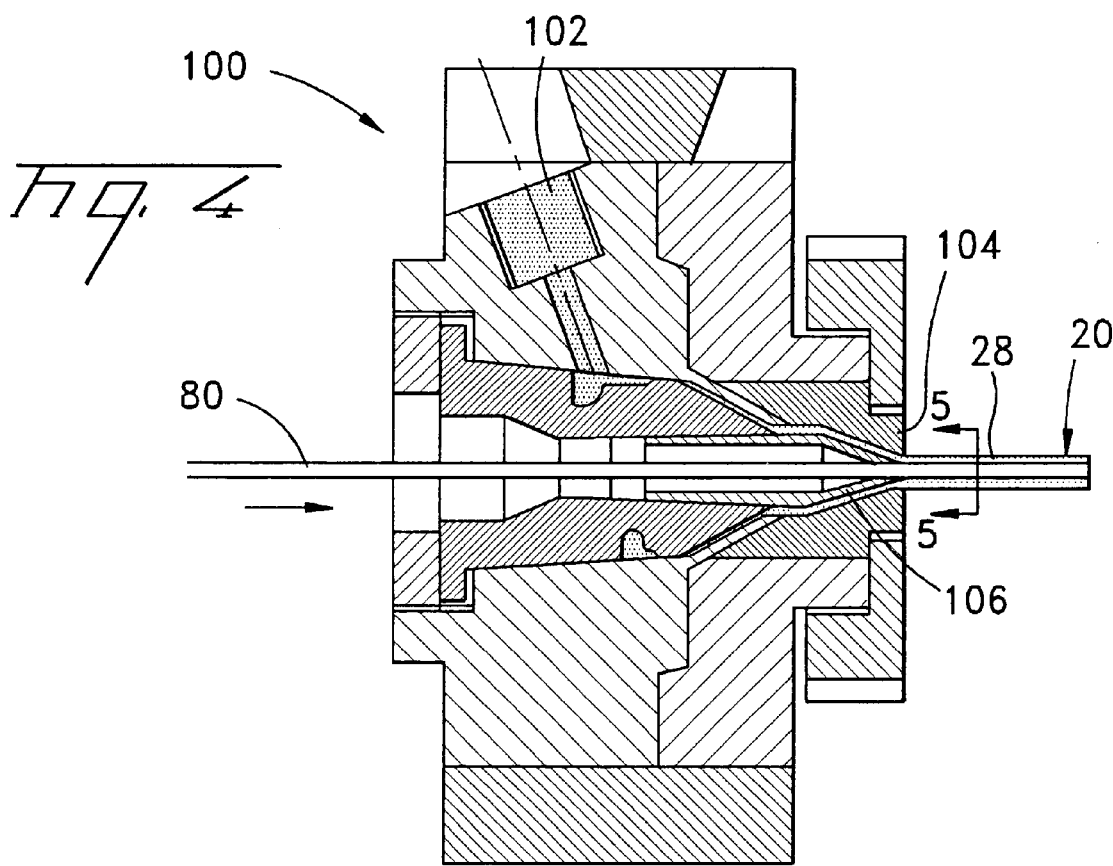
FIG. 4 is a schematic, cross-sectional view of an exemplary extrusion tool for manufacturing fiber optic cables according to the present invention.

A fiber optic cable 20 according to an embodiment of the present invention is depicted in FIG. 2. Fiber optic cable 20 includes a layer 26 being formed by at least one strength member 22 and at least one ultra-low shrinking filament 23. In one embodiment, layer 26 can be generally disposed between an optical fiber component 24 and a cable jacket 28 that generally surrounds a cable core 80. The at least one ultra-low shrinking filament 23 of the present invention can be used in combination with conventional optical cable strength components in various fiber optic cable designs.

In one embodiment optical fiber component 24 comprises a tight-buffered single-mode optical fiber. However, component 24 can include other optical fiber components, for example, non-buffered fibers, multi-mode tight-buffered optical fibers, loose fibers, ribbonized fibers and/or can include more than one component 24 stranded with or without a central member. Each optical fiber preferably includes a silica-based core that is operative to transmit light and is surrounded by a silica-based cladding having a lower index of refraction than the core. A soft primary coating surrounds the cladding, and a relatively rigid secondary coating surrounds the primary coating. Single and multi-mode optical fibers are available commercially from Corning Inc.

Ultra-low shrinking filaments 23 generally have a linear shrinkage of about 0.2% or less, preferably about 0.1% or less, when heated and held at about 85° C. for about seven days. An ultra-low shrinking filament generally includes a plurality of individual hairs that may number into hundreds or more. Ultra-low shrinking filaments 23 can include materials such as nylon, rayon, cotton, polyester, acrylics, acetates, polypropylene or blends thereof that are further processed, for example, with an autoclave or in another process, producing a substantially ultra-low shrinking filament. However, ultra-low shrinking filaments 23 can include composite ends, for example, a combination of strength members, such as, aramid fibers and a ultra-low shrinking filament, such as, nylon. Suitable ultra-low shrinking filaments 23 for use in optical cables of the present invention are available commercially from Hickory Yarns of Hickory, N.C. However, ultra-low shrinking filaments 23 of the present invention generally exclude conventional low-shrink fiber components, such as twisted polyester yarns, which have been used as ripcords in fiber optic cables. When conventional low-shrink fiber materials are subject to elevated temperatures they may have undesirable shrinking characteristics, generally greater than 0.2% when heated to 85° C. and held at that temperature for seven days. These undesirable shrinking characteristics of conventional fiber components can result in undesirable levels of optical attenuation when employed in fiber optic cables.

One embodiment includes layer 26 having two strength members 22 and two ultra-low shrinking filaments 23 that can be longitudinally disposed about or stranded around optical fiber component 24. Strength members 22 can include, for example, fiberglass, carbon fibers and aramid fibers, such as, kevlar®, vectran®, zylon®, technora®, spectra®, dyneema® and twaron®. More specifically, this embodiment can include two strength members 23, for example, 2500 denier aramid fibers and two ultra-low shrinking filaments 23, for example, 2450 denier ultra-low shrinking filaments, respectively. The embodiment can include fibers and filaments oppositely disposed; however, other arrangements can be used. Ultra-low shrinking filaments 23 can also comprise a plurality of ultra-low shrinking filaments 23 that are stranded together or ultra-low shrinking filaments 23 stranded together with strength members 22. By way of example, three 1000 denier ultra-low shrinking filaments with one twist in about two inches could be substituted for one 2450 denier ultra-low shrinking filament. Additionally, the ultra-low materials can be in non-filament forms, such as, a thin tape or a sheet that substantially surrounds optical fiber component(s) 24 to provide coverage and binding.

Ultra-low shrinking filaments 23 can also include a coating system. The coating system can include one or more coatings providing, for example, one or more of the following properties: anti-static, anti-abrasion, lubrication, flame-inhibitance, flame-resistance, non-wicking, smoke-inhibitance, water-blocking and/or water-swelling.

Layer 26 preferably preserves optical performance within desirable ranges and can include more or less than the two plus two strength member/ultra-low shrinking filament configuration of FIG. 2 as long as cable requirements are satisfied. In general, single optical fiber cables and cables with more than six optical fibers include more strength members than necessary for tensile strength to provide cushioning and padding, while cables with two to six optical fibers generally have no excess strength members for cushioning and padding. Layer 26 is preferably operable to provide tensile strength, cushion compression and impact loads, cover the optical fiber component 24 during extrusion of jacket 28, and/or bind the optical fiber component 24 to inhibit relative axial movement. More specifically, strength members 22 provide tensile strength, cushioning, covering and binding, while ultra-low shrinking filaments 23 provide cushioning, covering and binding.

Layer 26 can be generally interposed between optical fiber component(s) 24 and jacket 28. Preferably, layer 26 substantially surrounds optical fiber component 24. Strength members 22 and ultra-low shrinking filaments 23 of layer 26 preferably include a helical lay length between 300 millimeters and 600 millimeters but can be longitudinally disposed in a layless manner over optical fiber component 24.

Cable jacket 28 generally provides environmental protection and generally surrounds optical fiber component 24 and layer 26. Jacket 28 is preferably formed of flame-retardant plastics, such as PVC, flame-retarded polyethylene or low smoke zero halogen materials. The flame resistance may be specified, for example, by UL Standard 1666 for riser-rated cables or by UL standard 910 for plenum-rated cables. A tube-on extrusion process can be used to apply jacket 28, which generally has a thickness range of about 0.5 millimeters to about 1.2 millimeters, preferably about 1.0 millimeter.

Embodiments according to the present invention are mechanically robust; for example, cable 20 can carry a tensile load of about 50 lbs. or more without a significant attenuation. Additionally, cable 20 preferably has a minimum bend radius of about ten centimeters or less. Moreover, at the predetermined tensile load fiber optic component 24 and/or cable 20 should have a strain in the range of essentially about 0% to about 1.0%, more preferably between essentially about 0% and about 0.7% and most preferably between essentially about 0.3% and about 0.6%.

Cable 20 can include one or more ripcords 29 disposed between optical fiber component(s) 24 and jacket 28. Ripcord 29 allows the craftsperson to easily remove a section of jacket 28. Fiber optic cable 20 can have a range of outer diameters from about one millimeter and to about five millimeters or more, but most preferably the outer diameter is about 2.9 millimeters.

Additionally, care should exercised during the manufacture of cable 20. More specifically, payoff tensions should not stretch ultra-low shrinking filaments 23 of the present invention because excessive tensions would negate the essentially ultra-low shrink processing of fibers 23. Ultra-low shrinking filaments require low payoff tensions in the range of about 75 grams per fiber to about 700 grams per fiber, preferably about 150 grams or less per fiber. It is to be understood that the ultra-low shrinking filaments 23 materials of the present invention can have applications in any fiber optic cable and should not be limited to premises fiber optic cables.

Other materials can be employed in cables of the present invention such as, Basofil® available from BASF Inc., Nomex® available from Dupont or a chemically treated paper tape or sheet. These materials may provide cushioning, covering and/or binding. Additionally, an interfacial layer 25 can be disposed between optical fiber component 24 and jacket 28. Interfacial layer 25 can include powders, such as a talc powder, a thin film, a tape, a sheet or a water-swellable substance.

Fiber optic cable 20 is advantageous because, for example, it is a reliable and low cost cable. However, fiber optic cables according to the present invention can take various forms. For example, a fiber optic cable having a non-round cross-section with ribbonized optical fibers as disclosed in U.S. Application Ser. No. 09/107,676 filed on Jun. 30, 1998, which is incorporated herein by reference, could employ at least one ultra-low shrinking filament.

Additionally, FIG. 3 illustrates a fiber optic cable 30, which is another embodiment of the present invention. As described in conjunction with the embodiments of FIG. 2, fiber optic cable 30 includes twelve optical fiber components 34. A first group of fiber optic components 31 can include three, tight-buffered optical fiber components 34. First group 31 of fiber optic components may be generally longitudinally disposed or stranded, preferably S-Z stranded, around a central member 37, which can be a strength element such as aramid, fiberglass, GRP, steel, carbon fibers, but in one embodiment is a single 2450 denier kevlar® fiber. Interposed between first group 31 of fiber optic components and a second group 36 of fiber optic components is a first layer 35 having at least one strength member 32 and can include ultra-low shrinking filaments 33. In one embodiment, first layer 35 includes all strength members, more specifically, about one to about four aramid strength members. First layer 35 can include one to four aramid fibers ranging from about 200 denier to about 15,000 denier, more preferably, about 1400 denier to about 3000 denier, one embodiment includes three 1420 denier kevlar® fibers stranded helically around first group 31 of fiber optic components. However, in other embodiments first layer 35 can include various combinations of strength members 32 and ultra-low shrinking filaments 33 arranged in various configurations or all ultra-low shrinking filaments 33. More particularly, first layer 35 generally can include about one to about ten components, i.e., strength members 32 plus ultra-low shrinking filaments 33, ranging from about 200 denier to about 15,000 denier, more preferably, from about 1400 denier to about 3000 denier. Second group 36 of fiber optic components can include nine tight-buffered optical fiber components 34, which can be longitudinally disposed or stranded, preferably S-Z stranded around first layer 35. In one embodiment, a second layer 39 includes ultra-low shrinking filaments 33, more specifically, about one to about twenty-five ultra-low shrinking filaments 33, but can include strength members 32. Second layer 39 can include about two to about twenty-five nylon ultra-low shrinking filaments ranging from about 1400 denier to about 3000 denier. More specifically, second layer 39 can include eighteen 3000 denier nylon ultra-low shrinking filaments stranded counter-helically, which are disposed between second group 36 of fiber optic components and a jacket 38. However, in other embodiments second layer 39 can include various combinations of strength members 32 and ultra-low shrinking filaments 33 arranged in various configurations or all strength members 32. Moreover, a ripcord 40 can be generally disposed between jacket 38 and central member 37, preferably disposed between second layer 39 and jacket 38. Cable 30 can also generally include one or more interfacial layers (not illustrated) interposed between any of the components.

Manufacture

Care should be exercised during the manufacture of cable 30. For example, the various components of the cable can require different payoff tensions. By way of example payoff tensions for the manufacture of cable 30 include the following ranges: (1) central member 37 generally includes the highest payoff tension of components of cable 30 generally in the range of about 300 grams to about 700 hundred grams, preferably in the range of about 400 grams to about 600 grams, most preferably about 500 grams; (2) ultra-low shrinking filaments 33 of the present invention generally include the lowest payoff tensions in the range of about 75 grams per filament to about 700 grams per filament, more preferably in the range of about 75 grams per fiber to about 225 grams per fiber, most preferably about 150 grams or less per fiber; (3) strength members 32 generally employ substantially similar payoff ranges as the ultra-low shrinking filament 33; and (4) fiber optic components 34 can have a range of payoff tensions of generally about 100 grams per fiber to about 300 grams per fiber, more preferably generally about 150 grams per fiber to about 250 grams per fiber, most preferably about 200 grams or less per fiber.

Figure 5:
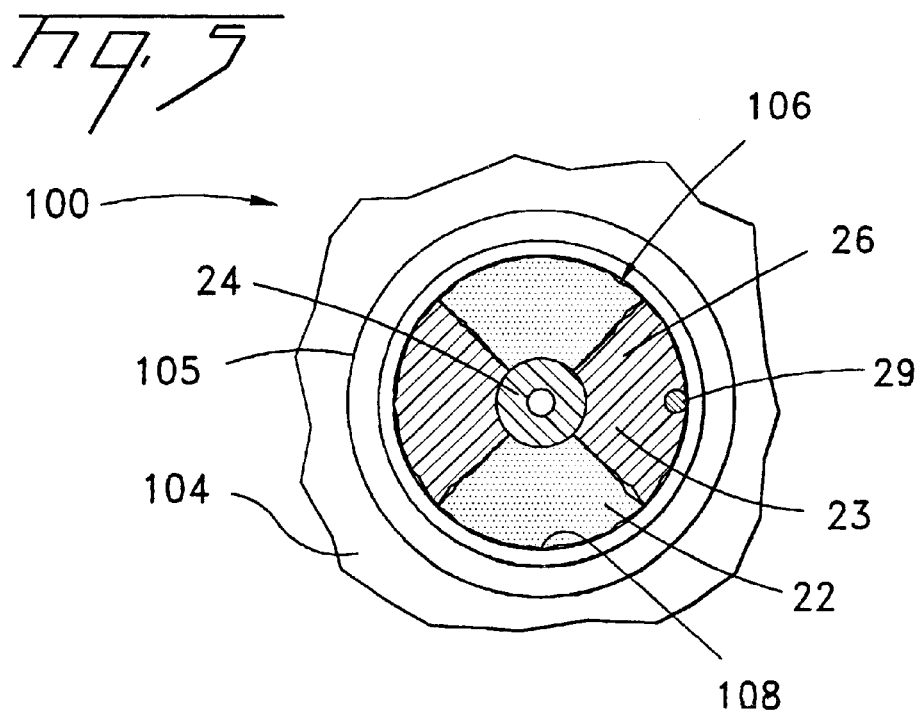
FIG. 5 is an enlarged view of the exit face of the extrusion tooling taken at line 5—5 of FIG. 4.

The manufacture of cables according to the present invention can be accomplished by operation of exemplary extrusion tooling 100. (FIGS. 4–5). By way of example, extrusion tooling 100 is operative to extrude jacketing material 28 about a core 80 of cable 20, core 80 can include at least one optical fiber component 24 and layer 26, which can include strength member 22 and ultra-low shrinking filament 23 (FIG. 5). As core 80 is fed into extrusion tooling 100 (FIG. 4), a jacketing compound, e.g., flame-retardant plastic, is supplied under suitable temperature and pressure conditions to an inlet port 102. The jacketing compound is channeled toward a die 104 and a tip 106. The jacketing compound surrounds core 80 thereby forming jacket 28 therearound to complete cable 20.

FIG. 4 schematically shows an exit face of extrusion tooling 100 with the jacketing compound or melt removed for illustration purposes. In one embodiment of the present invention, tip 106 includes an orifice 108 defined within the end portion of tip 106 for receiving core 80. As illustrated in FIG. 5, core 80 can include components 24 and 26 and/or 29. However, core 80 can include various cable components, for example a central member, ripcord or interfacial layer, but at a minimum core 80 includes at least one optical fiber component, at least one strength member and at least one ultra-low shrinking filament. More particularly, tip 106 can include a round section that generally complements core 80, however other shapes can be employed. Tip 106 includes a diameter generally greater than the respective diameter of core 80. Die 104 includes a die orifice 105 that defines the outer surface of jacket 28. A tube-on extrusion results in a jacket 28 with a generally round cross-section, as exemplified by the embodiment of FIG. 2. In the tube-on process, the end of tip 106 is generally flush with the face of die 104.

Additionally, a pressure extrusion process or a tubing-on plus vacuum draw down process can be used. In a pressure extrusion process, the end of tip 106 is generally recessed from the face of die 104. Whereas in the tubing-on plus vacuum draw down process, the end of tip 106 is generally flush with the face of die 104. In general, the die orifice 105 used for the pressure extrusion process is relatively smaller than the die orifice 105 used for the tubing-on plus vacuum draw down process.

Many modifications and other embodiments of the present invention, within the scope of the appended claims, will become apparent to a skilled artisan. For example, a cable can include two to thirty-six fiber optic components or more in a plurality of groups or a single group. Moreover, a cable of the present invention could also be employed as a unit of a break-out cable. Therefore, it is to be understood that the invention is not to be limited to the specific embodiments disclosed and that modifications and other embodiments can be made within the scope of the appended claims. Although specific terms are employed herein, they are used in a generic and descriptive sense only and not for purposes of limitation. The invention has been described with reference to premises cable designs but the inventive concepts of the present invention are applicable to other cable types as well.

That which is claimed:

1. A fiber optic cable, comprising:
   at least one optical fiber component;
   at least one strength member;
   at least one ultra-low shrinking filament, said at least one ultra-low shrinking filament having a shrinkage of about 0.2% or less when heated and held at about 85° C. for about seven days; and
   a cable jacket, said at least one strength member and said at least one ultra-low shrinking filament being disposed generally between said at least one optical fiber component and said cable jacket.

2. The fiber optic cable according to claim 1, said at least one ultra-low shrinking filament having a shrinkage of about 0.1% or less when heated and held at about 85° C. for about seven days.

3. The fiber optic cable according to claim 1, said at least one ultra-low shrinking filament fiber selected from nylon, rayon, cotton, polyester, acrylics, acetates, polyproylene or blends thereof.

4. The fiber optic cable according to claim 1, said at least one ultra-low shrinking filament comprising a nylon material.

5. The fiber optic cable according to claim 1, said at least one ultra-low shrinking filament being a composite filament.

6. The fiber optic cable according to claim 1, said at least one ultra-low shrinking filament having a coating system.

7. The fiber optic cable according to claim 1, said at least one strength member comprising aramid fibers.

8. The fiber optic cable according to claim 1, said at least one strength member comprising kevlar® fibers.

9. The fiber optic cable according to claim 1, said at least one optical fiber component being selected from a tight-buffered optical fiber, a non-buffered optical fiber or an optical fiber ribbon.

10. The fiber optic cable according to claim 1, said cable being a premises cable.

11. The fiber optic cable according to claim 1, said cable being either riser or plenum rated.

12. The fiber optic cable according to claim 1, further comprising an interfacial layer disposed between said optical fiber component and said jacket.

13. A fiber optic cable, comprising:
    at least one optical fiber component being generally stranded around a central member;
    a first layer comprising at least one strength member and at least one ultra-low shrinking filament, said first layer being disposed generally between said at least one optical fiber component and a cable jacket;
    said at least one ultra-low shrinking filament having a shrinkage of about 0.2% or less when heated and held at about 85° C. for about seven days; and
    said jacket generally surrounding said at least one optical fiber component, said central member, and said first layer.

14. The fiber optic cable according to claim 13, said at least one ultra-low shrinking filament having a shrinkage of about 0.1% or less when heated and held at about 85° C. for about seven days.

15. The fiber optic cable according to claim 13, said at least one ultra-low shrinking filament selected from nylon, rayon, cotton, polyester, acrylics, acetates, polypropylenne or blends thereof.

16. The fiber optic cable according to claim 13, said at least one ultra-low shrinking filament comprising a nylon material.

17. The fiber optic cable according to claim 13, said at least one ultra-low shrinking filament being a composite filament.

18. The fiber optic cable according to claim 13, said at least one ultra-low shrinking filament having a coating system.

19. The fiber optic cable according to claim 13, said at least one strength member comprising aramid fibers.

20. The fiber optic cable according to claim 13, said at least one strength member comprising a Kevlar® aramid fiber.

21. The fiber optic cable according to claim 13, said at least one strength member and said at least one ultra-low shrinking filament being generally stranded around said at least one optical fiber component.

22. The fiber optic cable according to claim 13, said at least one optical fiber component being selected from a tight-buffered optical fiber, a non-buffered optical fiber or an optical fiber ribbon.

23. The fiber optic cable according to claim 13, further comprising optical fiber components stranded around said first layer; a second layer comprising at least one strength member and at least one ultra-low shrinking filament, said second layer disposed between said first layer and said jacket.

24. The fiber optic cable according to claim 23, said second layer being stranded.

25. The fiber optic cable according to claim 13, said cable being a premises cable.

26. The fiber optic cable according to claim 13, said cable being either riser or plenum rated.

27. The fiber optic cable according to claim 13, further comprising an interfacial layer disposed between said optical fiber component and said jacket.

28. A fiber optic cable, comprising:
    a first group of tight-buffered optical fiber components being generally adjacent a central member;

a first layer being disposed generally between said first group of tight-buffered optical fiber components and a second group of tight-buffered optical fiber components;

a second layer being disposed generally between said second group of tight-buffered optical fiber components and a cable jacket, said jacket generally surrounding said central member, said first and second groups and said first and second layers; and one of said layers comprising at least one ultra-low shrinking filament, said at least one ultra-low shrinking filament having a shrinkage of about 0.2% or less when heated and held at about 85° C. for about seven days.

29. The fiber optic cable according to claim 28, said at least one ultra-low shrinking filament having a shrinkage of about 0.1% or less when heated and held at about 85° C. for about seven days.

30. The fiber optic cable according to claim 28, said at least one ultra-low shrinking filament selected from nylon, rayon, cotton, polyester, acrylics, acetates, polypropylene or blends thereof.

31. The fiber optic cable according to claim 28, said at least one ultra-low shrinking filament comprising a nylon material.

32. The fiber optic cable according to claim 28, said at least one ultra-low shrinking filament being a composite filament.

33. The fiber optic cable according to claim 28, said at least one ultra-low shrinking filament having a coating system.

34. The fiber optic cable according to claim 28, said at least one central member comprising aramid fibers.

35. The fiber optic cable according to claim 28, said at least one central member comprising a Keviar® aramid fiber.

36. The fiber optic cable according to claim 28, said cable being a premises cable.

37. The fiber optic cable according to claim 28, said cable being either riser or plenum rated.

38. The fiber optic cable according to claim 28, further comprising an interfacial layer disposed between said central member and said jacket.

* * * * *